United States Patent
Shmidt et al.

(10) Patent No.: US 11,439,955 B2
(45) Date of Patent: Sep. 13, 2022

(54) SYSTEM FOR PURIFYING A LIQUID

(71) Applicant: Electrophor Inc., Woodmere, NY (US)

(72) Inventors: Joseph Lvovich Shmidt, Woodmere, NY (US); Yurij Vladimirovich Tatuev, St. Petersburg (RU); Vladimir Sergeevich Urozhaev, St. Petersburg (RU)

(73) Assignee: ELECTROPHOR, INC., Woodmere, NY (US)

( * ) Notice: Subject to any disclaimer, the term of this patent is extended or adjusted under 35 U.S.C. 154(b) by 337 days.

(21) Appl. No.: 15/757,064

(22) PCT Filed: Jul. 21, 2016

(86) PCT No.: PCT/RU2016/000466
§ 371 (c)(1),
(2) Date: Aug. 6, 2018

(87) PCT Pub. No.: WO2017/039485
PCT Pub. Date: Mar. 9, 2017

(65) Prior Publication Data
US 2018/0345221 A1    Dec. 6, 2018

(30) Foreign Application Priority Data
Sep. 2, 2015 (RU) .......................... RU2015137550

(51) Int. Cl.
*B01D 65/02* (2006.01)
*B01D 61/12* (2006.01)
(Continued)

(52) U.S. Cl.
CPC ........... *B01D 61/12* (2013.01); *B01D 61/025* (2013.01); *B01D 61/027* (2013.01); *B01D 61/08* (2013.01);
(Continued)

(58) Field of Classification Search
CPC .... B01D 61/025; B01D 61/027; B01D 61/08; B01D 2311/14; B01D 2311/25;
(Continued)

(56) References Cited

U.S. PATENT DOCUMENTS 2,910,836 A   11/1959  Karrer
3,493,496 A   2/1970   Bray
(Continued)

FOREIGN PATENT DOCUMENTS

CN    101732901    6/2010
CN    107108267    8/2017
(Continued)

OTHER PUBLICATIONS

WO2015121821A1—EPO Machine Translation (Year: 2020).*
(Continued)

*Primary Examiner* — Patrick Orme
(74) *Attorney, Agent, or Firm* — Fitch, Even, Tabin & Flannery LLP

(57) ABSTRACT

A valved raw liquid supply line, which is connected to a filtration unit including a liquid purification unit with an inlet and with outlets for purified liquid and drain liquid, a mixing device, a means for maintaining pressure, a means for maintaining a recirculating flow of liquid, which is located on a line supplying a mixture of raw liquid and concentrate upstream of the liquid purification unit, a recirculating line, a purified liquid line, a drain liquid line, and a control unit, which is connected to the means for maintaining pressure, pressure monitor, the raw liquid supply valve and a drain liquid discharge valve. The means for maintaining pressure is located on a raw liquid supply line upstream of the liquid mixing device. The technical result is a longer system working life, more efficient use of raw liquid, and reduced energy expenditure.

10 Claims, 1 Drawing Sheet

(51) Int. Cl.
*C02F 1/00* (2006.01)
*C02F 1/44* (2006.01)
*C02F 9/00* (2006.01)
*B01D 61/02* (2006.01)
*B01D 61/08* (2006.01)
*C02F 1/32* (2006.01)
*C02F 103/08* (2006.01)

(52) U.S. Cl.
CPC ............. *B01D 65/02* (2013.01); *C02F 1/008* (2013.01); *C02F 9/005* (2013.01); *B01D 2311/14* (2013.01); *B01D 2311/25* (2013.01); *B01D 2311/2619* (2013.01); *B01D 2313/50* (2013.01); *B01D 2315/12* (2013.01); *B01D 2315/20* (2013.01); *B01D 2321/02* (2013.01); *B01D 2321/10* (2013.01); *B01D 2321/14* (2013.01); *C02F 1/001* (2013.01); *C02F 1/32* (2013.01); *C02F 1/441* (2013.01); *C02F 1/442* (2013.01); *C02F 2103/08* (2013.01); *C02F 2201/005* (2013.01); *C02F 2209/005* (2013.01); *C02F 2209/03* (2013.01); *C02F 2301/046* (2013.01); *C02F 2303/04* (2013.01); *C02F 2303/16* (2013.01); *C02F 2307/10* (2013.01); *Y02A 20/131* (2018.01)

(58) Field of Classification Search
CPC ............ B01D 2311/2619; B01D 61/12; B01D 65/02; B01D 2321/02; C02F 1/0008; C02F 1/32; C02F 1/441; C02F 1/44; C02F 2103/08
See application file for complete search history.

(56) References Cited

U.S. PATENT DOCUMENTS

| | | | |
|---|---|---|---|
| 3,794,172 | A | 2/1974 | Bray |
| 4,086,166 | A | 4/1978 | Martin |
| 4,176,063 | A | 11/1979 | Tyler |
| 4,243,523 | A | 1/1981 | Pelmulder |
| 4,626,346 | A | 12/1986 | Hall |
| 4,833,888 | A | 5/1989 | Kerner |
| 4,891,594 | A | 1/1990 | Wilfley |
| 4,973,404 | A | 11/1990 | Weber |
| 4,981,594 | A | 1/1991 | Jones |
| 4,983,301 | A | 1/1991 | Szuecz |
| 4,997,553 | A | 3/1991 | Clack |
| 5,049,272 | A | 9/1991 | Nieweg |
| 5,266,203 | A | 11/1993 | Mukhopadhyay |
| 5,503,735 | A | 4/1996 | Vinas |
| 6,068,764 | A | 5/2000 | Chau |
| 6,093,312 | A | 7/2000 | Boulter |
| 6,103,125 | A * | 8/2000 | Kuepper ............ B01D 61/025 210/637 |
| 6,162,361 | A | 12/2000 | Adiga |
| 6,190,558 | B1 | 2/2001 | Robbins |
| 6,290,856 | B1 | 9/2001 | Beall |
| 6,331,253 | B1 | 12/2001 | Schrive |
| 7,285,210 | B2 | 10/2007 | Schmitt |
| 7,338,595 | B2 | 3/2008 | VanNewenhizen |
| 7,601,256 | B2 | 10/2009 | Beall |
| 7,628,921 | B2 | 12/2009 | Efraty |
| 9,550,150 | B2 | 1/2017 | Smirnov |
| 10,954,141 | B2 | 3/2021 | Wilson |
| 2002/0100716 | A1 | 8/2002 | Bosko |
| 2005/0023198 | A1 | 2/2005 | Halemba |
| 2005/0109703 | A1 | 5/2005 | Newenhizen |
| 2007/0151925 | A1 | 7/2007 | De Los Reyes |
| 2009/0113898 | A1 | 5/2009 | Kirol |
| 2009/0152197 | A1 | 6/2009 | Lilas |
| 2010/0018220 | A1 | 1/2010 | Modad |
| 2011/0180465 | A1 | 7/2011 | Richetti |
| 2011/0198275 | A1 | 8/2011 | Hayes |
| 2011/0303660 | A1 | 12/2011 | Yang |
| 2012/0048790 | A1 | 3/2012 | Voelker |
| 2012/0168368 | A1 | 7/2012 | De Los Reyes |
| 2012/0234739 | A1 * | 9/2012 | Smirnov ............ B01D 61/025 210/97 |
| 2013/0334115 | A1 | 12/2013 | Voelker |
| 2014/0061129 | A1 | 3/2014 | Hoz |
| 2014/0110337 | A1 | 4/2014 | Hoz |

FOREIGN PATENT DOCUMENTS

| | | | | |
|---|---|---|---|---|
| CN | 107250063 | | 10/2017 | |
| CN | 108473341 | | 8/2018 | |
| CN | 108473342 | | 8/2018 | |
| DE | 102006015675 | | 10/2007 | |
| DE | 202011000680 | | 9/2011 | |
| DE | 16842406 | | 11/2018 | |
| DE | 16842407 | | 11/2018 | |
| EP | 0479492 | | 4/1992 | |
| EP | 1183212 | | 3/2002 | |
| EP | 3241807 | | 11/2017 | |
| EP | 3345871 | | 7/2018 | |
| EP | 3345872 | | 7/2018 | |
| FR | 2940764 | | 7/2010 | |
| FR | 2940764 | A1 * | 7/2010 | ............. B01D 65/02 |
| RU | 2004233 | | 12/1993 | |
| RU | 2047330 | | 11/1995 | |
| RU | 2100295 | | 12/1997 | |
| RU | 20256 | | 10/2001 | |
| RU | 22434 | | 4/2002 | |
| RU | 2199377 | | 2/2003 | |
| RU | 2287490 | | 11/2006 | |
| RU | 2297389 | | 4/2007 | |
| RU | 2006105261 | | 9/2007 | |
| RU | 2331586 | | 11/2007 | |
| RU | 2323036 | | 1/2008 | |
| RU | 2006121054 | | 1/2008 | |
| RU | 2323766 | | 5/2008 | |
| RU | 74909 | | 7/2008 | |
| RU | 89097 | | 11/2009 | |
| RU | 2421270 | | 4/2011 | |
| RU | 2473472 | | 1/2013 | |
| RU | 2484884 | | 6/2013 | |
| RU | 2494971 | | 10/2013 | |
| RU | 2531392 | | 10/2014 | |
| RU | 2614705 | | 3/2017 | |
| RU | 2015137550 | | 3/2017 | |
| SU | 1764094 | | 9/1992 | |
| WO | 8502783 | | 7/1985 | |
| WO | 9947226 | | 9/1999 | |
| WO | 0076639 | | 12/2000 | |
| WO | 02055182 | | 7/2002 | |
| WO | 2002055182 | | 7/2002 | |
| WO | 2010122336 | | 10/2010 | |
| WO | 2011110585 | | 9/2011 | |
| WO | 2012112045 | | 8/2012 | |
| WO | 2015083717 | | 6/2015 | |
| WO | 2015121821 | | 8/2015 | |
| WO | WO-2015121821 | A1 * | 8/2015 | ............... C02F 1/44 |
| WO | 2016108733 | | 7/2016 | |
| WO | 2017039485 | | 3/2017 | |

OTHER PUBLICATIONS

FR2940764A1—EPO Machine Translation (Year: 2020).*
International Extended Search Report in International Application No. PCT/RU2015/000890 dated May 25, 2018; 6 pages.
Written Opinion of the International Searching Authority for PCT/RU2015/000216 dated Aug. 13, 2015; 6 pages.
International Prelminary Report on Patentability and Written Opinion ofthe International Search Authority for PCT/RU2016/000466 dated Mar. 6, 2018; 5 pages.
International Search Report for PCT/RU2015/000890 dated Apr. 21, 2016, 1 page.
Supplemental European Search Report and Written Opinion for EP15875786 dated May 16, 2018; 7 pages.
International Search Report for PCT/RU2016/000466 dated Jan. 12, 2017; 1 page.

(56) References Cited

OTHER PUBLICATIONS

International Search Report for PCT/RU2016/000464 dated Jan. 19, 2017; 1 page.
International Search Report for PCT/RU2019/000309 dated Aug. 13, 2019; 2 pages.
International Search Report in corresponding International Application No. PCT/RU2015/000216, dated Aug. 13, 2015, 3 pages.
International Report on Patentability in corresponding International Application No. PCT/RU2015/000216, dated Jul. 8, 2015, 6 pages.

* cited by examiner

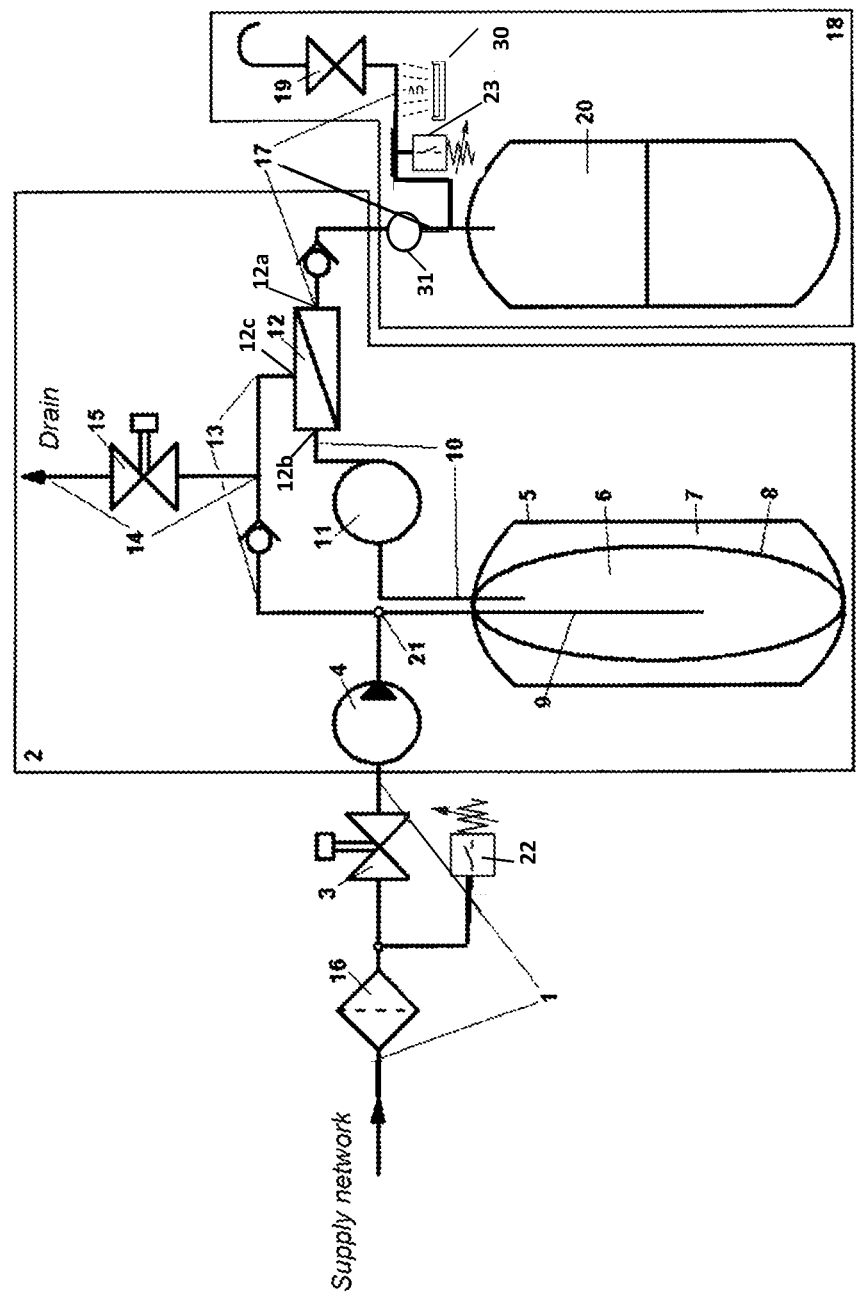

SYSTEM FOR PURIFYING A LIQUID

CROSS REFERENCE TO RELATED APPLICATIONS

This patent application is the national phase of PCT/RU2016/000466 filed Jul. 21, 2016, which claims the benefit of Russian Patent Application No. 2015137550 filed Sep. 2, 2015.

TECHNICAL FIELD

The invention relates to systems for purification and/or desalination of liquid, mostly water, used in domestic and/or drinking water supply in residential and/or industrial environment, summer cottages and garden plots.

BACKGROUND

A variety of liquid purification systems are known and quite widely spread.

A reverse osmosis liquid treatment system is disclosed in U.S. Pat. No. 6,290,856 (C02F 1/50, publ. 18.09.2001, applicant Worldwide Water Inc, US). The liquid purification system comprises a raw liquid feed line with a raw liquid feed valve mounted thereon, a filtration unit including a liquid purification means with a raw liquid inlet and purified liquid and drain liquid outlets, a purified liquid line, and a drain liquid line. The filtration unit further comprises a liquid storage device comprising in one embodiment a water-water tank with a purified liquid storage cavity and a drain liquid displacement cavity, wherein the storage cavity is connected to the purified liquid line, and the displacement cavity is connected to a line for supplying drain liquid into the displacement cavity. In a second embodiment, the liquid storage device comprises a water-air tank with a purified liquid storage cavity, and a displacement cavity filled with a compressed gas, e.g. air. The line for supplying drain liquid into the displacement cavity with a drain liquid supply valve mounted thereon is coupled to the drain liquid line. Valves mounted on the raw liquid feed line and the line for supplying drain liquid into the displacement cavity respond to pressure variation in the purified liquid line. A pressure controller is provided in the drain discharge line for maintaining the pressure in the liquid purification means at a predetermined level to prevent build up of contaminations on the surface of the liquid purification means. The system further comprises a biocide dispenser coupled to the purified liquid supply line upstream of the liquid purification means.

The liquid purification system operates in the following manner. Raw liquid is admitted into the liquid purification means of the filtration unit through the raw liquid feed line via the raw liquid feed valve open. After the liquid purification means, purified liquid passes through the purified liquid line to the storage cavity of the liquid storage device. As the storage cavity is filled, the pressure in it and in the purified liquid line gradually grows. Once a predetermined pressure is reached, the valve in the raw liquid feed line shuts off the flow of raw liquid into the system. The liquid purification process is interrupted. At intake of purified liquid from the storage cavity of the liquid storage device, pressure in the purified liquid line will decrease. Once pressure in the purified liquid line reaches a predetermined level, the valve in the raw liquid feed line and the valve in the drain liquid supply line in the displacement cavity of the liquid storage device are open. Raw liquid flows through the raw liquid feed line for purification into the liquid purification means. Drain liquid enters the displacement cavity through the drain liquid supply line. Once pressure of drain liquid entering the displacement cavity exceeds pressure of so purified liquid in the storage cavity, purified liquid is displaced into the purified liquid line. When intake of purified liquid stops, pressure in the purified liquid line and the purified liquid storage cavity of the liquid storage device gradually grows, and drain liquid is displaced from the displacement cavity of the liquid storage device into drain. When pressure in the purified liquid line and the purified liquid storage cavity of the liquid storage device raise to a predetermined level, the valves in the raw liquid feed line and the drain liquid supply line in the displacement cavity of the liquid storage device are closed. The system goes into quiescent state, and a predetermined amount of liquid comprising biocides is supplied from the biocide supply unit into the liquid purification means; this liquid remains in the membrane until the system switches to the raw liquid purification mode.

According to the description of the system taught in U.S. Pat. No. 6,290,856, in the liquid purification process the amount of produced drain liquid substantially exceeds the amount of produced purified liquid, and the liquid purification system does not provide for recycling the drain liquid. Drain liquid is removed from the system over the entire filtration process, which reduces the efficiency of utilization of raw liquid. Despite the fact that the controller mounted in the drain liquid line maintains pressure in the liquid purification means at the level necessary to prevent building up of contaminants, a thin polarization layer is formed over time on the surface of the liquid purification agent, which eventually solidifies and impairs the efficiency of the membrane operation. A liquid purification system according to U.S. Pat. No. 6,290,856 does not provide for flushing of the liquid purification means. Flushing of the liquid purification means to prevent deposition of contaminants in the liquid purification means is replaced by supplying a portion of biocides-containing liquid into the liquid purification means. As stated in the description of U.S. Pat. No. 6,290,856, to fully remove biocides from the system the liquid purification means is to be additionally flushed. The present invention overcomes these drawbacks, particularly, by the provision of recirculation of liquid and removal of contaminants from the liquid purification means without supplemental substances.

Another liquid purification system is disclosed in U.S. Pat. No. 5,503,735 (B01D 61/12, Water Factory Systems, US). The system comprises a raw liquid feed line with a raw liquid feed valve mounted thereon, a filtration unit including a pressure maintenance means, a liquid purification means with a raw liquid inlet and purified liquid and drain liquid outlets, a purified liquid line, a drain liquid line with a drain discharge valve, a recirculation line, a control unit coupled to the pressure maintenance means, a pressure monitoring means and the valve mounted in the raw liquid feed line. The drain discharge line comprises a pressure relief valve and a flow restrictor. A flush line is connected to the drain discharge line upstream of the pressure relief valve, and a recirculation line is connected to the drain discharge line downstream of the pressure relief valve and to the raw liquid feed line upstream of the pressure maintenance means. A flush valve is mounted in the flush line. The control unit of the liquid purification system is further coupled to the flush valve in the flush line.

The liquid purification system operates in the following manner. Raw liquid is admitted through the raw liquid feed line via the pressure maintenance means into the liquid purification means. After the liquid purification means, purified liquid flows to the purified liquid line. Drain liquid is discharged from the system after the liquid purification means through the drain discharge line via the pressure relief valve and the restrictor. However, a small amount of liquid flows to the recirculation line and, being blended with raw liquid, enters the pressure maintenance means. When the system switches to the flushing mode, the flush valve opens in the flush line, and raw liquid passes through the raw liquid feed line via the pressure maintenance means to the liquid purification means and is discharged to drain with high velocity through the flush line via the open flush valve, carrying away contaminants from the liquid purification means in turbulent flow.

Periodic flushing of the liquid purification means with raw liquid is accomplished with the pressure increasing means activated to ensure rapid turbulent flow of liquid through the liquid purification means. However, similarly to the previous prior art, despite flushing of the liquid purification means a thin polarizing layer of contaminants builds up on the surface of the membrane, which attracts larger particles and causes clogging thereby shortening the life of the liquid purification means and, as a consequence, of the whole system. The pressure maintenance means simultaneously acts as a circulating liquid flow maintenance means in the form of e.g. a high-duty pump. Performance of the pump must be higher than the flow drainage rate of drain liquid to provide the necessary high liquid velocity and stabilize pressure in the liquid purification means. In addition, the system provides for recycling back only a portion of drain liquid, while the liquid purification system according to the present invention provides for recycling back the entire drain liquid.

A liquid purification system, most closely related to the present invention, is disclosed in U.S. Pat. No. 6,190,558 (B01D 61/00, Nimbus Water Systems, Inc., US).

The system according to U.S. Pat. No. 6,190,558 comprises a raw liquid feed line with a raw liquid feed valve mounted thereon, a filtration unit including a liquid purification means with a raw liquid inlet and purified liquid and drain liquid outlets, a mixing device, a pressure maintenance means, a line for supplying raw liquid and the concentrate formed in the liquid purification process in the liquid purification means, a recirculation line, a purified liquid line, a drain liquid line, and a control unit coupled to the pressure maintenance means and a pressure variation monitoring means. In the filtration unit, a mixing device, such as a mixer unit, is simultaneously connected to the raw liquid feed line, the recirculation line, the raw liquid/concentrate supply line upstream of the pressure maintenance means and upstream of the liquid purification means. Additionally, the liquid purification system comprises a purified liquid recycling line with an electromagnetic valve and a pressure sensor mounted thereon, connected to the purified liquid line and the mixing device. A conductivity sensor is provided in the recirculation line. The conductivity sensor, the raw liquid feed valve and the valve in the line for recycling purified liquid back into the mixing device are coupled to the control unit in addition to the pressure maintenance means and the pressure maintenance monitoring means. A flow restrictor is provided in the drain liquid line connected to the liquid purification means.

The liquid purification system operates in the following manner. Once the valve in the purified liquid line is open, pressure in the purified liquid line drops. At the same time the pressure sensor in the purified liquid recycling line sends signal to the control unit to activate the pressure maintenance means and open the valve in the raw liquid feed line. Raw liquid flows through the raw liquid feed line via the open raw liquid feed valve into the mixing device, and further, through the pressure maintenance means, into the liquid purification means. After the liquid purification means, purified liquid enters the purified liquid line. Drain liquid flows through the recirculation line into the liquid mixing device, wherefrom, being blended with raw liquid, flows to purification. Once the valve in the purified liquid line is closed, the pressure in the purified liquid line increases. The control unit receives a signal from the pressure sensor in the purified liquid recycling line and opens the valve in the purified liquid recycling line. Purified liquid enters the liquid mixing device, and, being mixing with raw liquid, flows through the pressure maintenance means into the liquid purification means. Thus, liquid with a reduced contamination level passes through the system, and a portion of this mix is continuously discharged into drain. As mentioned before, the recirculation line comprises a conductivity sensor coupled to the control unit. As the raw liquid/purified liquid mix passes through the system, the conductivity sensor sends signals to the control unit, and upon reaching a predetermined low impurity concentration in the raw liquid/purified liquid mix the control unit deactivates the pressure maintenance means and closes the valve in the purified liquid recycling line and the valve in the liquid supply line. The system goes into quiescent state until the next opening of the valve in the purified liquid line.

Similarly to the previous prior art method (U.S. Pat. No. 5,503,735), to provide flushing of the liquid purification means and draining of the liquid flow, it is necessary to provide an increased velocity and pressure of liquid, which are imparted to the flow by the pressure maintenance means. Therefore, just as in the previous prior art, the pressure maintenance means acts simultaneously as a circulating liquid flow maintenance means and comprises a high-duty pump. Performance of the pump must be higher than the drainage rate of the drain liquid flow to provide the required high velocity of liquid and stabilize pressure in the liquid purification means. During flushing the liquid purification system according to U.S. Pat. No. 6,190,558, purified liquid is added to raw liquid, which reduces the amount of contaminants in the liquid entering the membrane during the flushing process. In the process of supplying the raw liquid/purified liquid mix to the liquid purification means, purification of liquid is accomplished; the resulting purified liquid is immediately supplied to the liquid mixing device for a new cycle. In such manner as much cycles take place, as suffice to achieve a predetermined low concentration of impurities in the mix. This mode of operation of the system leads to uneconomical use of purified liquid and power consumed for operation of the pressure maintenance means.

SUMMARY

The object and technical effect attained by the invention is to provide a novel liquid purification system, to extend the life of the liquid purification system, and to enhance the efficiency of utilization of raw liquid and reduce power consumption.

The object and technical effect are attained in a liquid purification system comprising a raw liquid feed line having a raw liquid feed valve mounted thereon and connected to a filtration unit including a liquid purification means with an inlet for raw liquid and outlets for purified liquid and drain liquid, a liquid mixing device, a pressure maintenance means, a line for supplying a mix of raw liquid and the concentrate formed in liquid purification process in the liquid purification means, a recirculation line, a purified liquid line, a drain liquid line, and a control unit coupled to the pressure maintenance means and a pressure variation monitoring means, and the raw liquid feed valve, wherein according to the invention the filtration unit is adapted to stabilize pressure in the liquid purification means with periodically draining the liquid flow with a drain liquid velocity exceeding the performance of the pressure maintenance means disposed in the raw liquid feed line upstream of the liquid mixing device in the form of a pressure tank connected to the line for mixing raw liquid and the concentrate formed in the filtration process, and simultaneously adjusting the amount of the concentrated liquid in the liquid mixing device through the coupling of the control unit with the means for maintaining pressure in the liquid mixing device in the form of a pressure tank and with a circulating liquid flow maintenance means disposed in the raw liquid/concentrate supply line upstream of the liquid purification means, and with a drain discharge valve disposed in the drain liquid line; wherein internal space of the liquid mixing device in the form of a pressure tank is separated by a flexible partition into a cavity for mixing raw liquid and the concentrate formed in the liquid purification process, and a cavity filled with a compressible medium; wherein the recirculation line is connected, via a connection unit, to the raw liquid feed line downstream of the pressure maintenance means, and to the line for mixing raw liquid and the concentrate formed in the liquid filtration process, connected to the raw liquid/concentrate mixing device; wherein the control unit is configured to regulate flushing of the liquid purification means by periodically deactivating the pressure maintenance means and opening the drain discharge valve after predetermined time intervals; wherein the liquid purification system further comprises a purified liquid unit connected to the purified liquid line; wherein the purified liquid unit includes a purified liquid feed means with a liquid disinfection means disposed upstream of the purified liquid feed means; wherein the purified liquid unit further comprises a purified liquid circulating flow maintenance means and a purified liquid accumulation device connected to an inlet of the purified liquid feed means and to an outlet of the purified liquid circulating flow maintenance means.

BRIEF DESCRIPTION OF THE DRAWINGS

FIG. 1 shows a schematic diagram of a liquid purification system.

DETAILED DESCRIPTION

A liquid purification system (FIG. 1) comprises a raw liquid feed line (1) having a raw liquid feed valve (3) mounted thereon and connected to a filtration unit (2) including a pressure maintenance means (4) mounted on the raw liquid feed line (1), a liquid mixing device (5) connected to a raw liquid/concentrate mixing line (9) and to a raw liquid/concentrate supply line (10) connected to an inlet (12c) of a liquid purification means (12). The raw liquid/concentrate mixing line (9) is connected, via a connection unit (21), downstream of the pressure increasing means (4), to the raw liquid feed line (1) and to a recirculation line (13). Purified liquid outlet (12a) of the liquid purification means (12) is connected through a purified liquid line (17) to a purified liquid unit (18). Drain liquid outlet (12b) of the liquid purification means (12) is connected to the recirculation line (13) connected, via the connection unit (21), to the raw liquid feed line (1) and to the raw liquid/concentrate mixing line (9). A pressure variation monitoring means (22), e.g. a low-pressure switch, is mounted in the raw liquid feed line (1) and coupled to a control unit (not shown in FIG. 1). A prefilter (16) is further provided in the raw liquid feed line (1).

A drain liquid line (14) with a drain discharge valve (15) mounted thereon and coupled to the control unit is connected to the recirculation line (13).

The liquid mixing device (5) is in the form of a pressure tank, whose internal space is separated by a flexible partition (8) into a cavity (6) for mixing raw liquid and the concentrate formed in the liquid purification process, and a cavity (7) filled with a compressible medium e.g. air.

A circulating liquid flow maintenance means (11), e.g. a circulation pump, is mounted in the raw liquid/concentrate supply line (10) upstream of the liquid purification means (12).

The control unit is coupled to the valve (3) mounted in the raw liquid feed line (1), the valve (15) mounted in the drain liquid line (14), the pressure maintenance means (4), the circulating liquid flow maintenance means (11) and the pressure variation monitoring means (22).

The liquid purification means (12) can be in the form of e.g. a reverse osmosis membrane or nano-filtration membrane.

A purified liquid unit (18) connected to a purified liquid line (17) comprises a purified liquid supply means (19) in the form of e.g. a tap. A purified liquid accumulation device (20), e.g. a water-air tank, can be arranged upstream of the purified liquid supply means (19), with a purified liquid circulating flow maintenance means (31), e.g. a circulation pump, mounted upstream of it. A pressure variation monitoring means (23), e.g. a high-pressure switch, is mounted downstream of the purified liquid storage device (20) in the purified liquid line (17), and a liquid disinfection means (30), e.g. a flow-through UV lamp (not shown) can be further provided.

Within the scope of distinctive features, the liquid purification system is intended for implementing the following liquid filtration process.

At startup of the liquid purification system, raw liquid is admitted from a source (not shown in FIG. 1) to the inlet of the raw liquid feed line (1) and through the open valve (3) connected to the control unit enters, via the prefilter (16), a pressure increasing means (4). Then, raw liquid flows through a raw liquid/concentrate mixing line (9) into a liquid mixing device (5). Owing to the fact that the pressure increasing means (4) is disposed upstream of the liquid mixing device (5), raw liquid enters a storage cavity (6) under pressure, which is maintained constant during the liquid filtration cycle and sufficient for passage of liquid through one liquid purification means (12). Further, raw liquid flows through a raw liquid/concentrate supply line (10) via a circulating flow maintenance means (11) into a liquid purification means (12). Purified liquid enters a purified liquid supply line (17). Drain liquid returns through a recirculation line (13) back to the liquid mixing device (5) into a raw liquid/concentrate mixing cavity (6). Furthermore, raw liquid continues flowing through the raw liquid feed line (1) to the raw liquid/concentrate mixing line (9), and further, to the cavity (6) of the raw liquid/concentrate mixing device (5) in the amount equal to that of the produced purified liquid. Uniform mixing of raw liquid with the concentrate takes place in the mixing device (5) in the cavity (6). As mentioned above, the cavity (7) is filled with a compressible medium, e.g. air. When liquid begins filling the cavity (6), pressure in the cavity (7) gradually grows.

During the liquid filtration process, at operation of the pressure maintenance means (4), pressure of liquid in the cavity (6) is gradually growing over time.

Like any hydrodynamic process, the liquid adhering to the surface of the membrane moves more slowly than its main stream. While the main stream can be turbulent, the near-surface liquid layer over the membrane remains laminar. This layer is called boundary layer. When raw liquid passes through the membrane (i.e. at the instant when raw liquid is separated into purified and drain), substantially all salt ions remain in the boundary layer near the surface of the membrane. This effect was called "concentration polarization", at which the concentration of salts on the surface of the liquid purification means increases; it raises the osmotic pressure in it and reduces the specific productivity of the liquid purification means.

During the liquid filtration process, a portion of concentrated liquid is periodically discharged to drain during a short time. At the same time the control unit outputs a signal to open a valve (15). The circulating liquid flow maintenance means (11) can continue to work or be shut down. When the valve (15) opens, pressure in the liquid purification means (12) drastically drops. As the time of opening the valve (15) for draining is very short, and the drop between pressure in the purified liquid line (17) and the liquid purification means (12) is substantial, at closing the drain discharge valve (15) the liquid purification means will experience hydraulic impacts. However, owing to the provision of the liquid mixing device (5) in the system, which accumulates pressure in the liquid filtration process and is mounted downstream of the pressure maintenance means (4), when the drain discharge valve (15) is closed the pressure in the liquid purification means (12) is stabilized. At the instant of opening the drain discharge valve (15) the concentrated liquid under the pressure accumulated in the cavity (7) of the liquid mixing device (5) passes through the raw liquid/concentrate supply line (10) via the circulating liquid flow maintenance means (11) with high velocity into the liquid purification means (12) and is discharged to drain, and at the same time the polarization layer formed at the concentration polarization is removed from the surface of the purification means.

When the purified liquid storage device (20) in the purified liquid unit (18) is fully filled with purified liquid, the liquid mixing device (5) is fully emptied. The control unit receives a signal from a pressure variation monitoring means (23), such as a high-pressure switch, disposed in the purified liquid line (17), and closes the valve (3), deactivates the pressure maintenance means (4), while the circulating liquid flow maintenance means (11) remains activated, and the valve (15) opens. Concentrated liquid flows from the cavity (6) of the mixing device (5) through the raw liquid/concentrate supply line (9) into the circulating liquid flow maintenance means (11), and is discharged to drain via the liquid purification means (12) through the drain discharge line (14) and via the open valve (15). Then, the liquid purification means (12) is flushed with raw liquid. The control unit outputs a signal to open the drain discharge valve (15), while the valve (3) stays open, and the pressure maintenance means (4) stays activated. Raw liquid flows through the raw liquid feed line (1) via the pressure maintenance means (4), into the cavity (6) of the liquid mixing device (5), and further, through the raw liquid/concentrate supply line (10) via the circulating liquid flow maintenance means (11) into the liquid purification means (12), and then, through the drain discharge line (14) via the open drain discharge valve (15) the small amount of raw liquid/drain liquid mix remained in the system is withdrawn from the system. Upon completion of flushing the liquid purification means (12) with raw liquid the system goes to quiescent state until the purified liquid supply means (19) is open and pressure in the purified liquid storage device (20) in the purified liquid unit (18) drops. At this time the control unit receives a signal from the pressure variation monitoring means (22) disposed in the purified liquid line (17), and filtration process is initiated again.

The present description represents a preferred embodiment of the invention. Various modifications can be made in the embodiment without departing from the scope of claims, thereby offering the possibility of its wide application.

Similarly to the liquid purification system taught in the closest prior art and in U.S. Pat. No. 5,503,735, stabilization of pressure at periodic flushing of the liquid purification means with raw liquid is provided owing to the pressure maintenance means impairing high velocity to the liquid flow through the liquid purification means. However, owing to the design features described above, the system according to the present invention provides for stabilization of pressure in the liquid purification means at periodic draining of the liquid flow with a velocity of concentrated liquid exceeding the productivity of the pressure maintenance means, without mixing the concentrated liquid with raw liquid. Owing to the fact that the polarization layer of contaminants, which contributes to salting the liquid purification means, is destroyed at the short-term discharge of drain from the surface of the liquid purification means, the operation stability and the life of the liquid purification means, and hence the entire liquid purification system, increase. The system also provides for recirculation of all concentrated liquid, which results in a more efficient utilization of raw liquid.

The invention claimed is:

1. A liquid purification system, comprising:
  a raw liquid feed valve configured to mount to a raw liquid feed line; a filtration unit comprising:
    a liquid purification unit with an inlet for raw liquid and an outlet for purified liquid and an outlet for drain liquid,
    a means for maintaining pressure,
    a raw liquid/concentrate supply line to supply a mix of raw liquid and concentrate formed in a liquid purification process to the liquid purification unit,
    a liquid mixing device comprising a pressure tank having a first cavity and a second cavity separated by a flexible partition and connected to the raw liquid/concentrate supply line to supply a mix of the raw liquid and the concentrate to the liquid purification unit from the first cavity, the liquid mixing device connected to receive the concentrate into the first cavity from the liquid purification unit in a way to build pressure within the liquid mixing device by compressing the second cavity during receiving the concentrate during the liquid purification process,
    a recirculation line,
    a purified liquid line,
    a drain liquid line connected to the outlet for drain liquid,
    a circulating liquid flow maintenance means disposed in the raw liquid/concentrate supply line upstream of the liquid purification unit, and
    a drain discharge valve disposed in the drain liquid line,
  wherein in response to opening the drain discharge valve, the drain discharge valve, the liquid mixing device, and the liquid purification device are connected such that drain liquid from the first cavity of the liquid mixing device drains through the liquid purification device using the pressure built in the liquid mixing device with the flexible partition during receiving the concentrate during the liquid purification process and at a drain liquid velocity exceeding a liquid velocity for liquid driven by the means for maintaining pressure, the drain liquid discharging while simultaneously reducing an amount of the concentrate in the liquid mixing device.

2. The liquid purification system according to claim 1, wherein the second cavity is configured to be filled with a compressible medium.

3. The liquid purification system according to claim 1, wherein the recirculation line is connected, via a connection unit, to the raw liquid feed line downstream of the means for maintaining pressure, and to the line to supply the mix of the raw liquid and the concentrate connected to the liquid mixing device.

4. The liquid purification system according to claim 1, further comprising a control unit connected and configured to regulate flushing of the liquid purification unit by periodically deactivating the means for maintaining pressure and opening the drain discharge valve after predetermined time intervals.

5. The liquid purification system according to claim 1, further comprising a purified liquid unit connected to the purified liquid line.

6. The liquid purification system according to claim 5, wherein the purified liquid unit comprises a purified liquid supply means with a liquid disinfection device disposed upstream of the purified liquid supply means.

7. The liquid purification system according to claim 6, wherein the purified liquid unit further comprises a purified liquid circulating flow maintenance means and a purified liquid accumulation device connected to an inlet of the purified liquid feed and to an outlet of the purified liquid circulating flow maintenance means.

8. The liquid purification system according to claim 7, wherein the liquid disinfection device is disposed upstream of the purified liquid accumulation device.

9. A liquid purification method comprising:
supplying a mix of raw liquid and concentrate formed in a liquid purification process to a liquid purification unit via a raw liquid/concentrate supply line,
receiving concentrate from the liquid purification unit into a liquid mixing device to build pressure within the liquid mixing device, the liquid mixing device comprising a pressure tank connected to the raw liquid/concentrate supply line to supply a mix of the raw liquid and the concentrate to the liquid purification unit,
opening a drain discharge valve,
in response to opening the drain discharge valve, draining drain liquid from the liquid mixing device through the liquid purification device using the pressure built during the receiving the concentrate, the draining the drain liquid occurring at a drain liquid velocity exceeding a liquid velocity for liquid driven by a means for maintaining pressure during a liquid purification process, the drain liquid discharging while simultaneously reducing an amount of the concentrate in the liquid mixing device.

10. The liquid purification method according to claim 9, further comprising regulating flushing of the liquid purification unit by periodically deactivating the means for maintaining pressure and opening the drain discharge valve after predetermined time intervals.

* * * * *